United States Patent Office

3,743,703
Patented July 3, 1973

3,743,703
METHOD OF PREPARING SYNTHETIC DIAMONDS
Alexei Iosifovich Prikhna, ulitsa Vyshgorodskaya 33, kv. 20; Alexandr Alexandrovich Shulzhenko, ulitsa Novo-Konstantinovskaya 17, kv. 27; and Margarita Yakovlevna Katsai, ulitsa Dorogozhitskaya 24, kv. 39, all of Kiev, U.S.S.R.
No Drawing. Filed Nov. 18, 1970, Ser. No. 90,867
Claims priority, application U.S.S.R., Jan. 19, 1970, 1514366
Int. Cl. C01b 31/06
U.S. Cl. 423—446
2 Claims

ABSTRACT OF THE DISCLOSURE

Diamond is synthesized by subjecting a mixture of graphite and a metal catalyst to a temperature of at least 1150° C. and a pressure of at least 40 kbars, throughout the entire volume of the catalyst there being dispersed graphite crystallites. The process enables one to prepare a large number of separate, small, well defined diamond monocrystals in a relatively short time. The diamond product has high abrasion properties.

---

The present invention relates to a method and process for the preparation of superhard materials, and more particularly to a method of preparing diamonds synthetically.

A known method of synthesizing diamonds comprises subjecting a reaction mixture consisting of graphite and a metal or an alloy catalyst to a temperature of at least 1150° C. and a pressure of at least about 40 kbars.

The above method requires the use of a special protective shell made of refractory metal, for the reaction mixture, and is characterized by a prolonged reaction time (at least 40 minutes).

Another method makes use of catalysts consisting at least of two metals, chosen from two groups, one comprising titanium, zirconium and hafnium, the other copper, silver and gold.

This method has low productivity, since only a few tiny diamond crystals can be obtained in a period of 20 minutes.

In this connection, at the present time, fine and ultra-fine fractions of grinding powder of synthetic diamonds are obtained by breaking up larger crystals or accretions. In this way the finished powder is made up chiefly of crystal fragments.

An object of the present invention is to provide a method which enables one to prepare a large number of separate, small, well defined diamond monocrystals in a relatively short time. Another object of the present invention is the preparation of diamonds which have high abrasive properties.

With these and other objects in view, there has been developed a method according to the invention which is characterized in that there is used as catalyst a metal or alloy through whose entire volume there is dispersed small graphite crystallites.

One of the embodiments of the invention, is a method in which the above described catalyst is obtained by saturating the molten metal or alloy with carbon, followed by cooling the melt at a controlled rate.

Another embodiment consists in a method in which the molten catalyst, saturated with carbon, is cooled at a rate of not less than 50° C. per minute.

One of the methods of preparing the catalyst, according to the invention consists in heating the mixture of metals or alloys with spectroscopically pure graphite in a graphite crucible to 1600° C., maintaining this temperature for 3 hrs., and then cooling the melt at a rate of not less than 50° C. per minute. There are other ways of preparing the catalyst, which cause the separation of small graphite crystallites from the melt. The above catalyst may be used in the form of monolithic blocks or in the form of a powder.

A uniform mixture of spectroscopically pure graphite powder and the above mentioned powdered catalyst may be used as starting material. The proportion of graphite and catalyst is not a determining factor for the realization of the present invention. The preferred proportion of graphite to catalyst is given in the examples below.

The starting reaction mixture is placed in equipment designed for use at high temperatures and pressures; it may be of any type suitable for providing the temperature and pressure required for synthetizing the diamonds.

In particular, there may be used equipment with a cylindrical reaction vessel, to the bottom of which there are joined components made of hard alloys or steel; the side surfaces are made of materials which exhibit heat and electricity conducting properties such as pyrophyllite.

Heating the reaction mixture under pressure may be carried out by one of the known methods. In particular, there may be used a special graphite heater through which there is passed electric current.

The diamond powder prepared by the present method had better abrasive properties, when griding with the free powder, than diamond powder of the same particle size, made by breaking up large crystals or accretions of synthetic or natural diamond.

The practical realization of the present invention is illustrated by the following examples.

EXAMPLE 1

A uniform mixture of one part by weight of graphite powder and 4 parts by weight of alloy catalyst powder which is composed of nickel, manganese and 5–7% carbon is submitted to the action of pressures up to 55 kbar and of temperatures up to 1450° C. and kept under these conditions for 3 minutes. Under such conditions there were carried out 2160 experiments. The diamonds obtained were made up of more than 60% well defined crystals of a size in the range from 100 to 10 mkm.

EXAMPLE 2

A uniform mixture of one part by weight of graphite and five parts by weight of powdered alloy catalyst composed of nickel and 25% carbon was submitted to the action of a pressure of 51 kbar and of temperatures up to 1470° C. and maintained under these conditions for 5 minutes. There were carried out a total of 50 experiments. The diamonds prepared, were made up of 15% of suitably shaped crystals whose size ranged from 10 to 100 mkm.

EXAMPLE 3

A uniform mixture of 1 part by weight of graphite and 4 parts by weight of alloy catalyst composed of nickel, manganese and 5.8% carbon was submitted to pressures up to 55 kbar and temperatures up to 1460° C. and maintained under these conditions for 5 minutes. Under these conditions 2247 experiments were made. The diamonds obtained were made up of 70% of suitably shaped crystals whose size ranged from 10 to 100 mkm.

What we claim is:

1. A method of synthesizing diamonds which comprises subjecting a reaction mixture comprising:
   (a) graphite,
   (b) a metallic catalyst, and
   (c) graphite crystallites dispersed throughout the entire volume of the metallic catalyst by cooling a saturated carbon melt of the metallic catalyst to a temperature of at least about 1150° C. and a static pressure of at least about 40 kbars.

2. A method according to claim 1, in which the initial rate of cooling said melt is not less than 50° C. per minute.

References Cited
UNITED STATES PATENTS

| | | | |
|---|---|---|---|
| 3,401,019 | 9/1968 | Cowan et al. | 23—209.1 |
| 3,442,616 | 5/1969 | Wakatsuki et al. | 23—209.1 |
| 3,436,182 | 4/1969 | Induzuka et al. | 23—209.1 |
| 3,124,422 | 3/1964 | Custers et al. | 23—209.1 |

EDWARD J. MEROS, Primary Examiner